DE WITT C. COOKINGHAM & J. H. HERTNER.
CONTROLLER FOR ELECTRIC VEHICLES.
APPLICATION FILED MAR. 20, 1913.
1,270,789.
Patented July 2, 1918.
3 SHEETS—SHEET 1.
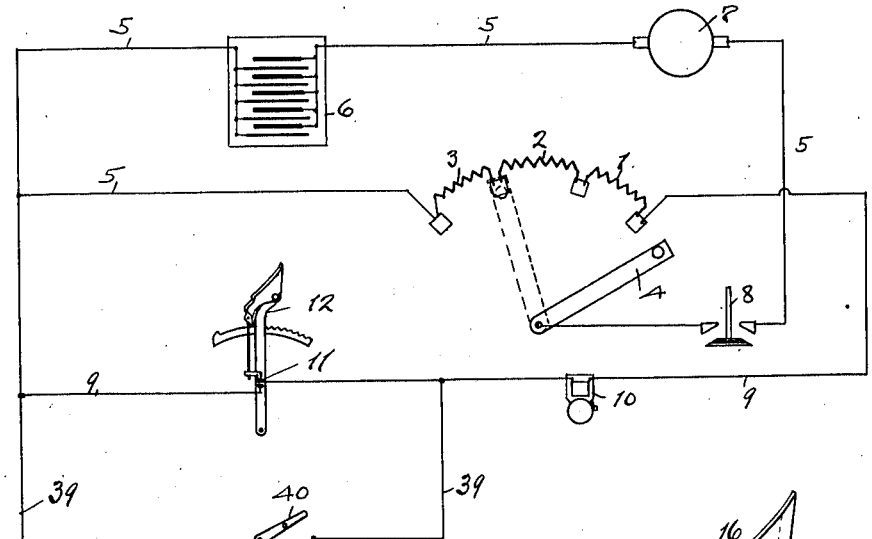
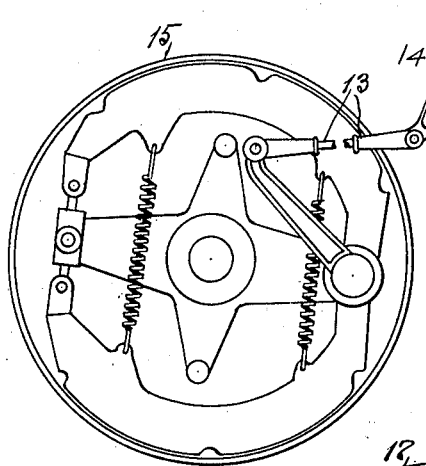
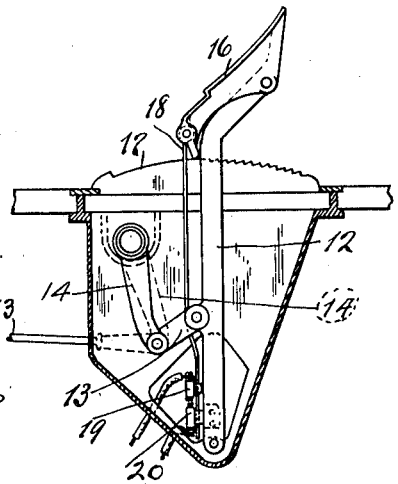
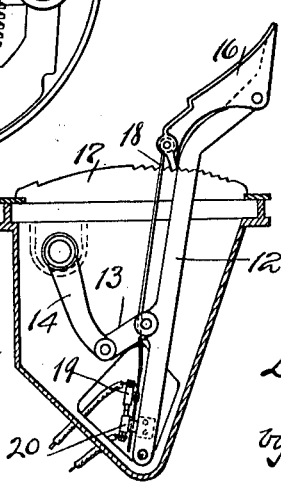

DE WITT C. COOKINGHAM & J. H. HERTNER.
CONTROLLER FOR ELECTRIC VEHICLES.
APPLICATION FILED MAR. 20, 1913.
1,270,789.
Patented July 2, 1918.
3 SHEETS—SHEET 2.
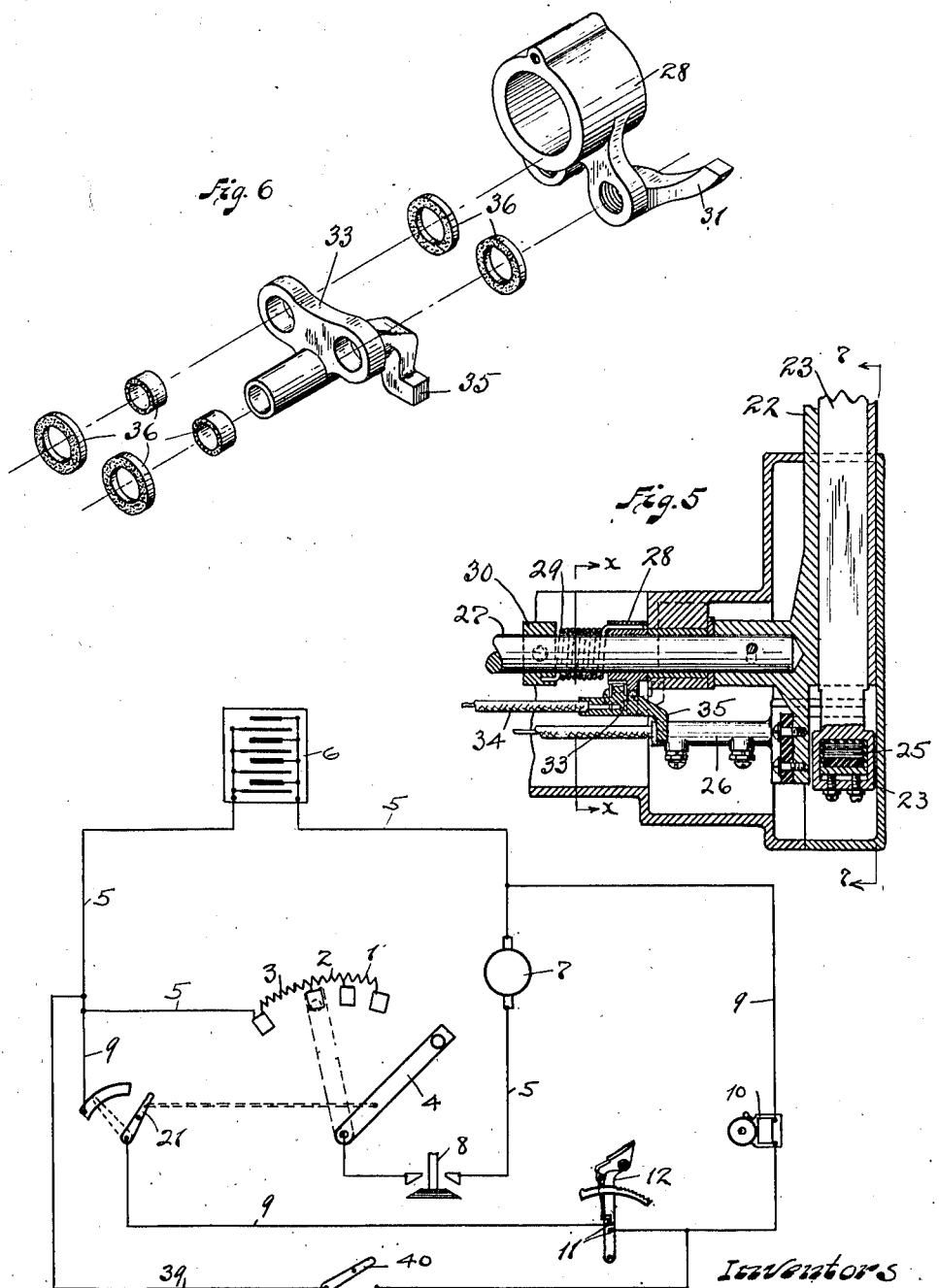

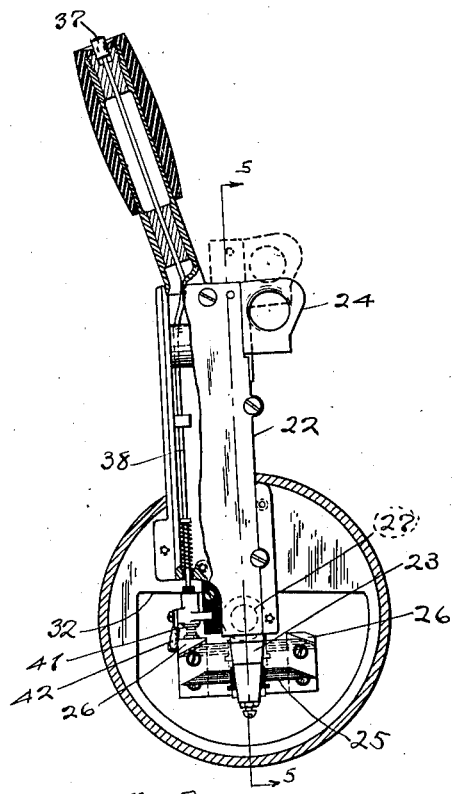
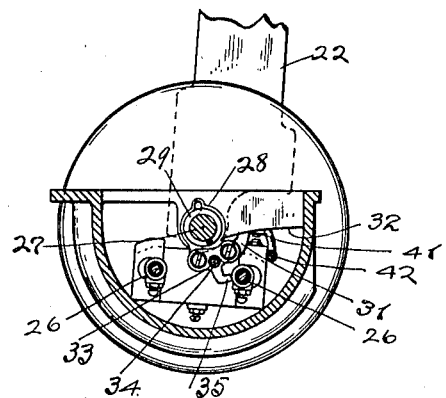
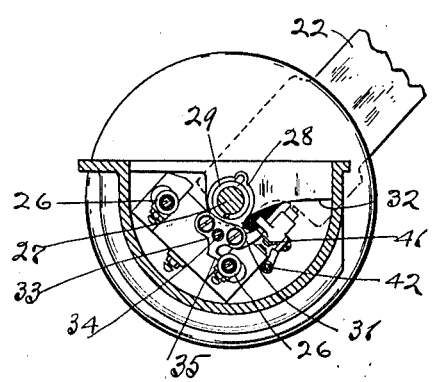
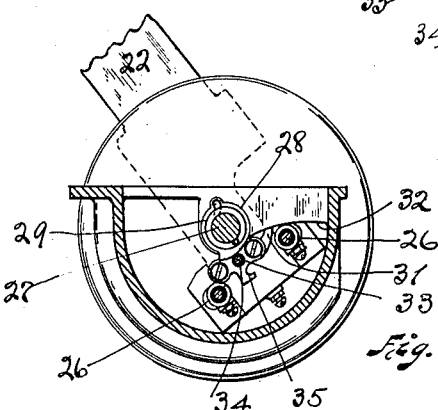

UNITED STATES PATENT OFFICE.

DE WITT C. COOKINGHAM, OF LAKEWOOD, AND JOHN H. HERTNER, OF CLEVELAND, OHIO, ASSIGNORS TO THE BAKER R & L COMPANY, OF CLEVELAND, OHIO, A CORPORATION OF OHIO.

CONTROLLER FOR ELECTRIC VEHICLES.

1,270,789.      Specification of Letters Patent.      Patented July 2, 1918.

Application filed March 20, 1913. Serial No. 755,636.

*To all whom it may concern:*

Be it known that we, DE WITT C. COOKINGHAM and JOHN H. HERTNER, both citizens of the United States, and respectively residents of Lakewood, county of Cuyahoga, and State of Ohio, and of Cleveland, county of Cuyahoga, and State of Ohio, have jointly invented a new and useful Improvement in Controllers for Electric Vehicles, of which the following is a specification, the principle of the invention being herein explained and the best mode in which we have contemplated applying that principle, so as to distinguish it from other inventions.

In the operation of electrically driven vehicles, and particularly electric automobiles, it is usual to provide a controller arm or lever whereby a rheostat or like device may be operated to vary the amount of current supplied the motor and to shut off such supply entirely. One type of such controlling mechanism is illustrated in U. S. Letters Patent No. 911,030 to D. C. Cookingham, dated February 2, 1909, and as there shown a single lever is adapted to operate both the controller proper and a hand brake, while a circuit opening and closing device is carried by such handle as well. In addition to a hand-operated brake, and independent of whether such a brake is provided or not, vehicles of the kind in hand are provided with brakes arranged to be operated by the foot of the operator, being actuated through a pedal. Such foot-operated brakes are applied directly to the rear wheels and are desirably made powerful so as to insure the immediate stopping of the car in case of an emergency, as also to securely lock the car when it has been stopped.

It has been found possible, even with less powerful foot-brakes, particularly where the car is being driven through a heavy road, to stall the motor, that is, stop the car, while some current was still being supplied to the motor. For example, the controller lever may be left in position to supply a current of minimum strength to such motor and the foot brake be applied and the car stopped, so that the operator may leave the same standing, forgetful of the current flowing through the stationary motor. The result is apt to be the overheating of the latter and serious damage to the windings.

The object of the present invention, accordingly, is to provide a warning device for use in conjunction with controlling mechanism of the character just described, whereby the operator cannot carelessly leave the car standing with the current flowing through the motor, whether the car be simply stalled by road conditions, or by the application of the foot brake. To the accomplishment of these and related ends the invention consists of the means hereinafter fully described and particularly pointed out in the claims.

The annexed drawings and the following description set forth in detail certain mechanism embodying the invention, such disclosed means constituting, however, but several of the various mechanical forms in which the principle of the invention may be used.

In said annexed drawings:—

Figure 1 is a diagrammatic view of one form of mechanism embodying the present invention; Fig. 2 is a side elevational view of a typical foot brake with the parts attached thereto that pertain particularly to the present invention; Fig. 2ª shows the pedal of said foot brake in a different operative position; Fig. 3 is a plan view of said pedal; Fig. 4 is a diagrammatic illustration, similar to Fig. 1, of a modified form of the invention; Fig. 5 is a sectional view of an operating lever in such modified form of construction illustrating an auxiliary switch device forming a feature of such modified construction; Fig. 6 is a perspective view of the several parts entering into such auxiliary switch; Fig. 7 is a broken section and side elevational view of the operating lever of Fig. 5, as indicated by the line 7—7 on said figure; and Figs. 8, 9 and 10 are sectional views taken on the line $x$—$x$, Fig. 5, and showing the parts in different operative positions.

In the simpler form of the invention illustrated in Fig. 1, the controlling mechanism proper, is represented diagrammatically as consisting of a series of resistances 1, 2 and 3, and a contact arm 4 which may be operated in any suitable manner, as for example, by an operating lever of the kind illustrated in the aforesaid Patent No. 911,030. By swinging said controller arm to the left, the circuit 5 which includes the storage battery 6 and motor 7, may be closed and resistances 1, 2 and 3 be successively cut out until a full flow of current is supplied to said motor. An independent switch 8 for opening or closing said circuit is also provided. Included in a circuit 9 in shunt with the portion of the motor circuit 5 which includes the controlling mechanism, is a bell 10 of familiar type, such bell circuit being controlled by a switch 11 carried by the pedal which operates the foot brake.

The details of construction of a preferred form of such pedal are fully shown in Figs. 2, 2ª and 3. As will appear from Fig. 2 more particularly, the pedal consists essentially of a lever 12 that is operatively connected by a system of links 13 and levers 14 with the brake 15. The upper end of the lever, which will normally project above the floor of the vehicle in front of the operator, carries a foot piece 16, pivotally attached to such upper end, the lower end of such foot piece normally resting on a segmental guide 17 which is smooth for a portion of its extent, the remainder being serrated or notched to engage with said foot piece and lock the lever in corresponding position. When the car is coasting, or when under other circumstances the brake is just temporarily applied, the foot-piece is not allowed to come into locking engagement, but when the car is stopped, it is the proper practice to push the foot brake lever forward and allow this foot piece to engage with the segment in order that the car may not accidentally start up under the influence of gravity, or by being pushed from without.

Carried by the lever 12 is a reciprocable plunger 18, the upper end of which is connected with the foot piece 16, the lower end of which carries a contact member 19 adapted to contact with a fixed member 20, said two members being included in the bell circuit 9 and constituting the stitch 11 whereby said circuit may be closed. It is only when the foot piece is allowed to drop into one of the serrations or notches on guide 17, that the plunger 18 is depressed sufficiently to close these contacts and thus close the bell circuit. In other words, it is only when the foot-brake lever 12 is locked in its forward operative position that such bell circuit is closed.

Referring again to Fig. 1, and assuming the bell circuit to be closed by the disposition of the foot brake lever in the fashion just described, it will be observed that no current, nevertheless, will pass through said bell circuit with the controller arm in its off position, as shown in said figure. If, however, said controller arm be moved over to the left until the circuit is closed, sufficient current will be shunted through the bell circuit to ring the bell. Accordingly, if the driver locks the car by operation of the foot brake with the controller lever in position where current is still allowed to flow through the motor, the bell will sound an alarm and thus advise the driver to shut off his current.

In place of relying on a disparity in resistances to cause a proper flow of current through the bell circuit when the latter is thus closed by operation of the foot brake lever, a switch positively actuated conjointly with the controller may be employed. This is the construction shown in diagrammatic fashion in Fig. 4, and in detail in Figs. 5 to 10, inclusive. In said diagrammatic view of Fig. 4, the arrangement of the storage battery, motor 6 and controller resistances 1, 2 and 3, in the motor circuit 5, is the same as in Fig. 1. In other words, by actuation of the controller arm 4 the motor circuit is first closed and successive resistances then cut out until a maximum flow of current is supplied to the motor, just as in the first-described construction. In this second construction, however, the bell circuit 9 is in parallel with the motor circuit, including such controller resistances, and while said bell circuit is adapted to be controlled by the operation of the foot brake lever 12 as before, another switch 21 is provided in addition to the switch 11 carried by said foot brake lever. The auxiliary switch, thus included in the bell circuit, is so connected with the contact arm 4 as to be closed in any position of said arm that closes the motor circuit, but said auxiliary switch is opened when the motor circuit is opened, by swinging the controller arm to off position, this being the position shown in said Fig. 4.

The particular construction of auxiliary switch illustrated in the figures above referred to has been designed with special regard to the type of controller mechanism illustrated in the aforesaid Patent No. 911,030, and is designed to be carried by a handled lever 22, such as is provided in said mechanism for operating the controller proper. This lever comprises essentially a hollow case with a handle at its upper end, in which hollow case is disposed a plunger 23 with a hand piece 24 at its upper end and a transversely disposed brush 25 at its lower end, which, in the raised position of said plunger, connects or bridges two terminals 26 and so corresponds with the switch 8 of Figs. 1 and 4, that forms the main circuit closing device for the motor. Operating lever 22 is mounted on a rock-shaft 27, which is connected to swing the contact arm 4 whereby the motor circuit is closed and opened independently of switch 8, and whereby the amount of resistance in said circuit is varied.

Carried by this same shaft 27, is the auxiliary switch device 21 which, as here structurally exemplified, comprises a bracket 28 pivotal upon said shaft and normally actuated by a coil spring 29 to turn in a counter-clockwise direction, as viewed in Figs. 8, 9 and 10, one end of said coil spring being attached to said bracket, and the other being attached to a collar 30 fixed on the shaft, as clearly shown in Fig. 5. Rotation of the bracket 28, in the direction just referred to, is normally limited by engagement of a projection 31 thereon with the casing 32, or other fixed part, said bracket being shown in such limiting position in Fig. 10.

Carried by this bracket, but insulated therefrom by washers 36, is a contact member 33, having attached thereto one of the leads 34 for the bell circuit 9. This contact member has a finger 35 which is adapted to contact with one of the main terminals 26 and thus close the aforesaid bell circuit. The disposition of parts is such that such contacting engagement of the finger 35 with the terminal 26 occurs whenever the operating lever 22 is moved forwardly of its neutral position. Thus in Fig. 8, contact has just occurred, while in Fig. 9, in which the lever is represented in its full forward position, it will be observed that this connection still persists, the oscillatory bracket 28 being simply swung around the rock-shaft 27 and the finger 35 being maintained in contact with the adjacent terminal 26 all the while by the action of the coil spring 29. It is only when the lever 22 is brought back to its "off" position, and the projection 31 on the bracket engages the casing 32, and its further rotation in this direction stopped, that the terminal 26 is moved away from the finger 35, thus temporarily held stationary, and the bell circuit broken.

From the foregoing description of the auxiliary switch device, it will be seen that whenever the lever 22 is in its "on" position, irrespective of the amount of resistance left in the motor circuit, the bell circuit 9 will be closed by the locking of the foot lever in its forward operative position. Under such conditions, in other words, the bell will be rung as a warning to the driver to shut off his current. The bell circuit, however, will be broken the moment the controller lever is brought back to its "off" position, where it should be when the car is standing.

Provision of a bell circuit thus controlled by the foot brake lever is independent of the regular bell circuit which is arranged to be closed and the bell thus rung by pressing a button 37 in the handle of the controller lever, as shown in Fig. 7. This button operates a plunger 38 which closes a circuit 39 independent of both the foot brake and the auxiliary switch, as shown in both Figs. 1 and 4. The switch 40, controlled by button 37, is, of course, merely diagrammatically shown in these two figures, but (see Fig. 7) conveniently consists of a contact member 41 that may be pressed against the adjacent terminal 26. The corresponding lead 42 for the bell circuit 39 is attached directly to this member 41.

While in Fig. 4, and the appropriate part of the foregoing description, the switch 21 has been referred to as being closed when contact arm 4 closes the circuit 5, and as being opened when said arm breaks such circuit; it should be evident that this relation may be easily varied. In fact it has been found desirable for certain uses to arrange this switch and contact arm so that the former will be closed in what is called the "neutral" position of the latter, this position of the contact arm in such case corresponding with the position of the controller lever 22 shown in Fig. 8. With this arrangement of parts, it will not suffice to keep the bell from ringing, when the brake is locked, to merely bring said lever back to "neutral", but the switch 8 in circuit 5 must be opened by depressing plunger 23 in the lever 22. The value of this additional precautionary feature will be readily understood.

In the practical embodiment of switch 21 illustrated in Figs. 5 to 10, inclusive, the relation of the opening and closing of said switch to the operation of the controller, i. e. the position of contact arm, is determined by the length of contact finger 35 on the member 33.

It does not require to be explained in detail, that the particular construction of switch 11 may be varied from that shown, any form of switch, operable in conjunction with the setting of the brakes to close the bell circuit, being in contemplation. So, too, it should be stated that the bell 10 is to be regarded as merely typical of any electrically operated alarm or signal device, and the term "bell" as herein used is to be understood as having this general significance.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:—

1. In an electric motor driven vehicle, or the like, the combination of a motor controller; a brake; an electric signal device; a circuit for said device, said circuit being in shunt with said controller; and means operable conjointly with said brake adapted to close said circuit.

2. In an electric motor driven vehicle, or the like, the combination of a motor controller; a brake; an electric signal device; a circuit for said device; two switches in said circuit; means operable conjointly with said brake adapted to close one of said switches; and other means operable conjointly with said controller adapted to close the other of said switches.

3. In an electric motor driven vehicle, or the like, the combination of a motor controller; a brake; an electric signal device; a circuit for said device, said circuit being in shunt with said controller and motor; two switches in said circuit; means operable conjointly with said brake adapted to close one of said switches; and other means operable conjointly with said controller adapted to close the other of said switches.

4. In an electric motor driven vehicle, or the like, the combination of a brake; an electric signal device; a circuit for said device; means for operating said brake including a lever; a movable member adapted to lock said lever in place; and a switch in said bell circuit operatively connected with said member, said switch being closed only in the locking position of said member.

5. In an electric motor driven vehicle, or the like, the combination of a brake; an electric signal device; a circuit for said device; means for operating said brake including a lever, a guide provided with notches, and a locking-member carried by said lever and adapted to engage such notches; and a switch in said bell circuit operatively connected with said locking-member, said switch being closed only when said member is in engagement with one of such notches.

6. In an electric motor driven vehicle, or the like, the combination of a brake; an electric signal device; a circuit for said device; means for operating said brake including a lever, a guide provided with notches, and a foot-piece pivotally attached to said lever and adapted to engage such notches to lock said lever in place; a reciprocable plunger carried by said lever; and a switch in said bell circuit connected to be closed upon depression of said plunger, said plunger being thus depressible only when said foot-piece is in engagement with one of such notches.

7. In an electric motor driven vehicle, or the like, the combination of a motor controller; a brake; an electric signal device; a circuit for said device; means for operating said brake including a lever; a movable member adapted to lock said lever in place; a switch in said bell circuit operatively connected with said member, said switch being closed only in the locking position of said member; and another switch in said circuit operated conjointly with said controller.

8. In an electric motor driven vehicle, or the like, the combination of a motor controller; a brake; an electric signal device; a circuit for said device; means for operating said brake including a lever, a guide provided with notches, and a locking-member carried by said lever and adapted to engage such notches; a switch in said bell circuit operatively connected with said locking-member, said switch being closed only when said member is in engagement with one of such notches; and another switch in said circuit operated conjointly with said controller.

9. In an electric motor driven vehicle, or the like, the combination of a motor controller; a brake; an electric signal device; a circuit for said device; means for operating said brake including a lever, a guide provided with notches, and a foot-piece pivotally attached to said lever and adapted to engage such notches to lock said lever in place; a reciprocable plunger carried by said lever; a switch in said bell circuit connected to be closed upon depression of said plunger, said plunger being thus depressible only when said foot-piece is in engagement with one of such notches; and another switch in said circuit operated conjointly with said controller.

10. In an electric motor driven vehicle, or the like, the combination of a motor controller; a brake; an electric signal device; a circuit for said device; means for operating said brake including a lever; a movable member adapted to lock said lever in pl^ce; a switch in said bell circuit operatively connected with said member, said switch being closed only in the locking position of said member; and another switch in said circuit connected with said controller so as to be closed in the "on" position of said controller and open in the "off" position of the latter.

11. In an electric motor driven vehicle, or the like, the combination of a motor controller; a brake; an electric signal device; a circuit for said device; a switch operable conjointly with said brake adapted to close said circuit; and another switch in said circuit connected with said controller so as to be closed in the "on" position of said controller and open in the "off" position of the latter.

12. In an electric motor driven vehicle, or the like, the combination of a motor controller; a brake; an electric signal device; a circuit for said device; a switch operable conjointly with said brake adapted to close said circuit; a lever for operating said controller; another switch in said circuit movable conjointly with said lever; a spring tending normally to close said switch; and a stop adapted to engage said switch to open the same when said lever is moved into "off" position.

13. In an electric motor driven vehicle, or the like, the combination of a motor controller; a brake; an electric signal device; a circuit for said device; a switch operable conjointly with said brake adapted to close said circuit; a lever for operating said controller; a member pivoted about the same axis as said lever; a contact carried by said member and another contact fixed on said lever, said contacts forming a switch adapted to close said circuit; a spring connected with said member and tending to move the same to bring said contacts together; and a stop adapted to engage said member to hold said contacts apart when said lever is moved into "off" position.

14. The combination with a brake; of a lever for operating the same; an electric signal device; a circuit for said device; a movable member adapted to lock said lever in place; and a switch in said bell circuit operatively connected with said member, said switch being closed only in the locking position of said member.

Signed by us, this 15th day of March, 1913.

DE WITT C. COOKINGHAM.
JOHN H. HERTNER.

Attested by—
H. B. FAY,
JNO. F. OBERLIN.